United States Patent
Nakayama et al.

(10) Patent No.: US 6,661,775 B1
(45) Date of Patent: Dec. 9, 2003

(54) REDUNDANT ROUTING WITH DEADLINES IN DATA NETWORKS

(75) Inventors: Marvin Kunio Nakayama, New York, NY (US); Bulent Yener, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/368,931

(22) Filed: Aug. 5, 1999

(51) Int. Cl.[7] .......................... H04L 12/66; H04L 12/26; H04L 12/28; H04L 12/56
(52) U.S. Cl. ................ 370/230.1; 370/236; 370/252; 370/255; 370/390; 370/395.1; 370/412; 709/104; 709/238
(58) Field of Search ................................ 370/218, 229, 370/230.1, 231–235, 242, 244, 245, 252, 253, 255, 351, 389, 390, 394, 395.1, 395.2, 395.4, 395.43, 400, 412, 432, 437, 450, 902; 709/103–105, 232–238

(56) References Cited

U.S. PATENT DOCUMENTS

| | | | |
|---|---|---|---|
| 5,732,218 A | | 3/1998 | Bland et al. |
| 5,831,975 A | | 11/1998 | Chen et al. |
| 5,991,414 A | * | 11/1999 | Garay et al. ................. 713/165 |
| 5,995,503 A | * | 11/1999 | Crawley et al. ............ 370/351 |
| 6,122,254 A | * | 9/2000 | Aydemir et al. ............ 370/235 |
| 6,233,226 B1 | * | 5/2001 | Gringeri et al. ............ 370/252 |
| 6,400,685 B1 | * | 6/2002 | Park ........................... 370/232 |

OTHER PUBLICATIONS

M.O. Rabin, Efficient dispersal of information for security, load balancing, and fault tolerance. Jrn. ACM, 36–2:335–348, 1989.

Bolot et al., "Adaptive FEC–Based Error Control for Internet Telephony", 8 pages.

S. Jamaloddin Golestani et al, To appear in Proceed. Of ICNP, Oct. 98, "A Class of End–to–End Congestion Control Aigoriths for the Internet."

D. Clark and J. Wroclawski. "An approach to service allocation in the internet." Internet Draft, page Jul., 1997.

David D. Clark et al. "Explicit Allocation of Best Effort Packet Delivery Service."

V.P. Kumar et al., "Beyond Best Effort: Router Architectures for the Differentiated Services of Tomorrow's Internet".

Ion Stoica et al.; "LIRA: An Approach for Service Differentiation in the Internet."

Lixia Zhang et al., "RSVP: A New Resource ReSerVation Protocol"; IEEE Network, Sep. 1993.

K. Nichols et al.; "A Two–bit Differenntiated Services Architecture for the Internet"; Internet Draft, Page Nov. 1997.

* cited by examiner

*Primary Examiner*—Hassan Kizou
*Assistant Examiner*—Ahmed Elallam

(57) ABSTRACT

A method and message router that breaks up files to be transferred over a network connection within a specified deadline into fixed-sized pieces. Each piece contains enough redundant information so that a subset (but not all) of the pieces will be sufficient to construct the file at the destination. The method and router determine optimal values for the number of pieces the file should be split into and the subset of pieces required to reconstruct the full contents of the file in order to maximize the probability that the file can be reconstructed at the destination by the specified deadline. The method and router provide an expected QoS guarantee by using redundancy with a deadline rather than reservations.

84 Claims, 7 Drawing Sheets

REDUNDANT ROUTING WITH DEADLINES IN DATA NETWORKS

BACKGROUND OF THE INVENTION

1. Field of the Invention

The present invention relates generally to the field of computer networks and, more particularly to redundant routing with deadlines for providing an expected quality of service (QoS) guarantee in packet-switching computer networks.

2. Description of the Related Art

Currently, the architecture of the Internet provides a simplistic service model known in the art as the point-to-point best service model. The point-to-point best service model, however, is inadequate for some of today's every developing complex distributed applications such as, for example, remote video and Internet conferencing applications. It has been determined by various scholars that the inadequacy stems in part from the failure of the point-to-point best service model to provide acceptable quality of service (QoS) to the data packets of these developing applications.

These newer and much more complex applications are extremely sensitive to the QoS that their data packets receive and the network servicing these application must go beyond the best-effort model to provide an acceptable QoS. L. Zhang et al., in RSVP: A New Resource ReSerVation Protocol, IEEE Network, September 1993, have proposed a reservation-based (RSVP) technique to ensure QoS over the Internet. Briefly, the RSVP technique allows applications to request network resources, such as bandwidth, to fulfill desired QoS requirements. Reservations are initiated at the information receivers and are carried to the routers along the communication path to the sender of the data destined for the receiver.

Other reservation-based techniques, similar to the technique described by L. Zhang et al., have also been proposed, The reservation-based approaches to QoS are sometimes collectively referred to as integrated-services or intserv. Although reservation-based techniques provide benefits that are not obtainable using the point-to-point best-effort model, they are not without their shortcomings. For example, these approaches rely on "good" estimates and scheduling of the buffer and bandwidth requirements needed to meet the QoS demands, which can be quite complex for bursty data traffic. That is, reservation-based techniques introduce additional complexity at the network nodes and require strict queuing schemes to ensure perflow (flow is the generic term often used to describe a network data traffic stream) processing with specified service requirements. Furthermore, reservation-based techniques require perflow state information and management at the routers, which may cause network scalabilty problems. Accordingly, it is believed that increasing the complexity of intermediate nodes to perform advanced operations will transform the nodes into bottlenecks in high-speed networks such as the Internet and are thus, undesirable.

As an alternative to the reservation-based or intserv based approaches to QoS, a new approach known in the art as differential services or diffserv has been proposed. The diffserv approach aims at reducing the perflow management and complexity at the high-speed routers associated with the intserv approaches. Examples of diffserv based approaches are described by D. Clark and J. Wroclawski, in An Approach to Service Allocation in the Internet, Internet Draft, July 1997 and K. Nichols et al., in A Two-bit Differentiated Services Architecture for the Internet, Internet Draft, November 1997. The main idea behind diffserv is to provide an aggregated treatment of user traffic that belongs to the same service class.

In some diffserv models, a non-deterministic assured level of service based on statistical provisioning specified in a service profile is provided, while in other diffserv models a premium based service based on peak-rate provisioning is provided. In both cases, user traffic is marked before it enters the network to indicate whether or not it follows the service description of the class. The packets that are not within the user's service description are the first ones dropped during periods of traffic congestion. Guaranteed QoS can not be provided because the model can not determine what other users in the network are doing. Although diffserv is a more scalable approach than intserv, it still requires reservations (i.e., reservations are made before entering the network boundary via a contract as opposed to marking the routers inside the network), which as noted above, is undesirable. Accordingly, there is a need and desire to efficiently provide a QoS guarantee in high-speed packet-switching data networks, such as the Internet that is not reservation-based.

SUMMARY OF THE INVENTION

The present invention provides a probabilistic quality of service in a high-speed packet-switching data network, such as the Internet that is not reservation-based.

The above and other features and advantages of the invention are achieved by a method and message router that breaks up files to be transferred over a network connection within a specified deadline into fixed-sized pieces. Each piece contains enough redundant information so that a subset (but not all) of the pieces will be sufficient to construct the file at the destination. The method and router determine optimal values for the number of pieces the file should be split into and the subset of pieces required to reconstruct the full contents of the file in order to maximize the probability that the file can be reconstructed at the destination by the specified deadline. The method and router provide an expected QoS guarantee by using redundancy with a deadline rather than reservations.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF PREFERRED EMBODIMENTS

The present invention provides an expected QoS guarantee for high-speed packet-switching data networks, such as the Internet, by using a redundancy with a deadline technique rather than reservations. As will be described below, the present invention breaks up files to be transferred over a network connection within a specified deadline into fixed-sized pieces. Each piece contains enough redundant information so that a subset (but not all) of the pieces will be sufficient to construct the file at the destination. The present invention determines optimal values for the number of pieces the file should be split into and the subset of pieces required to reconstruct the full contents of the file in order to maximize the probability that the file can be reconstructed at the destination by the specified deadline.

Figure 1:
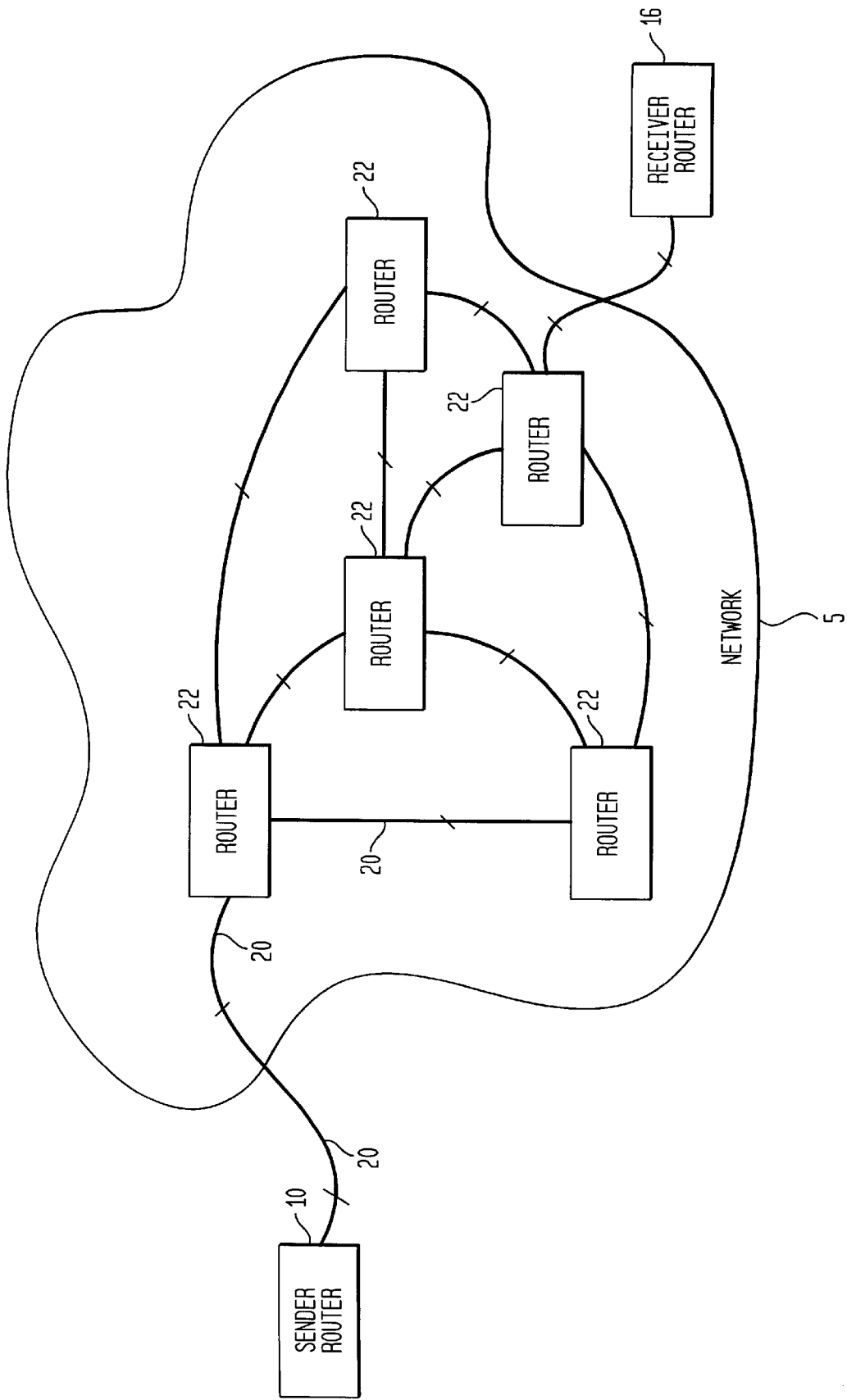
FIG. 1 illustrates a communication path between sender and receiver routers in a high-speed packet-switching network.

FIG. 1 illustrates a typical communication path between a sender router 10 that wants to transmit data to a receiver router 16 connected to a network 5. The network 5 may be a high-speed packet-switching data network such as the Internet. The sender and receiver routers 10, 16 are connected to and communicate with the network 5 via distinct communication lines 20 that allow data to be input from, or output to, the network 5. Internal to the network 5 are intermediate routers 22 that communicate with other routers 22 within the network 5 and the sender and receiver routers 10, 16 via distinct communication lines 20. Data transmitted from the sender router 10 will be passed through the intermediate routers 22 to the receiver router 16. As will be described below, the present invention will provide an expected QoS guarantee based on redundancy with a deadline for the communication between the sender and receiver router 10, 16.

Figure 2:
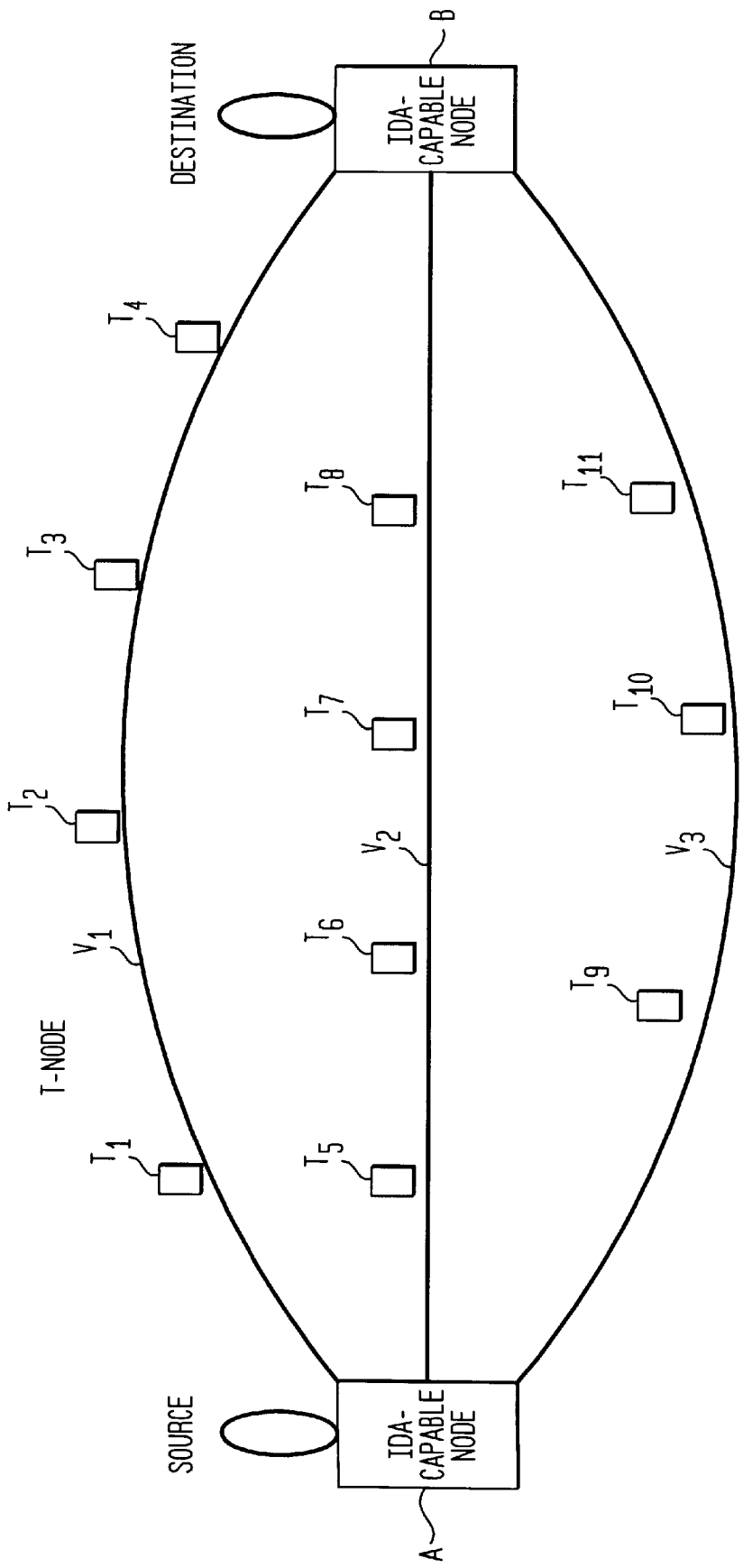
FIG. 2 illustrates virtual links between routers constructed in accordance with the present invention.

The present invention will break up a file F to be transmitted from a sender router (referred to herein as the origin) to a receiver router (referred to herein as a destination) into b pieces, each of size s, and uses redundancy such that any $m \equiv |F|/s$ pieces (i.e., any m identical to $|F|/s$ pieces) are enough to reconstruct the file within a time deadline $\Delta$. Thus, an expected QoS guarantee can be provided to an application of a high-speed packet-switching network such as the Internet. Prior to discussing the present invention in detail, the following network models and operation are provided as background information. Initially, referring to FIG. 2, the inventors have modeled the network architecture with a general-topology network with bi-directional links having two types of nodes. The first type of node is referred to as an Information-dispersal-algorithm-capable (IDA-capable) node. Two IDA-capable nodes are illustrated in FIG. 2 as nodes A and B. A node is deemed IDA-capable if it can execute the information-dispersal-algorithm described by M. O. Rabin, in Efficient Dispersal of Information for Security, Load Balancing, and Fault Tolerance, Jrn. ACM, 36-2:335–348, 1989, which is hereby incorporated by reference in its entirety. As will be described below, a uniquely modified IDA utilizing a time deadline will be used to split up with redundancy a file to be transmitted into discrete fixed-size pieces to achieve an expected QoS guarantee. The second type of node is referred to as a transient node (T-node). These nodes are not IDA-capable. Eleven T-nodes are illustrated in FIG. 2 as nodes $T_1, T_2, \ldots, T_{11}$.

Conceptually, the IDA-capable routers are similar to the multicast-capable routers since they are connected by tunneling. A tunnel is established between a pair of IDA-capable routers by encapsulating the packet to be transmitted into a new Internet protocol (IP) packet. An encapsulated packet may pass through several T-nodes. The outer IP packet header carries the IP addresses of the source and destination IDA-capable routers. Thus, the operation of the present invention is transparent to the T-nodes, which are presumed to be simple best-effort IP routers. The "Type of Service" (TOS) field in the packet can be used to distinguish a packet constructed in accordance with the present invention, i.e., redundancy with a deadline (RWD) packet. Upon identifying a RWD packet, an IDA-capable router extracts and processes it accordingly.

A tunnel between a pair of IDA-capable modes is called a virtual link, and its end points are referred to as virtual nodes. FIG. 2 illustrates three virtual links $V_1$, $V_2$, $V_3$ between two virtual nodes A and B. By definition the source and destination routers are IDA-capable nodes. Each virtual link e has a length $l_e \epsilon Z^+$, which is the number of T-node hops (called segments) in the virtual link, where $Z^+$ is the set of positive integers.

Multiple tunnels can be established between virtual nodes using the source-routing option (the options field is part of the IP protocol, but is not supported by all routers; nevertheless, it is presumed that it can be used for this model). To construct a virtual network, we look at the edge-disjoint tunnels connecting a pair of IDA-capable routers. The edge-connectivity of the underlying physical network topology determines an upper bound for the number of possible distinct virtual links. A virtual network can be represented by a graph $G=(V, E, l_e)$ where V is the set of IDA-capable nodes and E is the set of virtual links.

A discrete-time model is used as a network timing model. In this model, all of the network nodes are provided with a global-timing structure. If, for example, the Global Positioning System (GPS) is used for this purpose, each node in the network receives clock ticks from a GPS receiver and uses the ticks to keep its internal clock synchronized. For illustrative purposes, a clock tick will have a coarse granularity, i.e., a chain of events can be pipelined in a single clock tick based on the network conditions. For example, if the traffic load is low, a packet can traverse several T-nodes within one clock tick. However, for simplicity purposes, in the time model, at least one T-node is traversed during each tick.

A stochastic model of the network traffic is used. Initially, it is understood that many different traffic streams (e.g., best-effort, reservation-based, etc.) will share the network with the traffic introduced by the present invention (i.e., redundant routing with deadlines traffic). The traffic associated with the present invention is referred to herein as internal traffic, and the rest of the traffic is referred to herein as external traffic. Thus, both internal and external traffic share the bandwidth of a virtual link and the model of the network traffic is designed to isolate the impact of the redundancy introduced by the present invention from the effects of the external traffic. In addition, in the traffic model, there is little control over the amount of external traffic and that it is random.

In the traffic model, each virtual link e at each time t has an associated random rate $R_e(t) \geq 0$, which is the (integer) number of segments on link e that can be traversed in one clock tick ending at time t. Thus, at time t−1, a link may contain multiple packets, each of which is on a different segment of the link, and they all move forward $R_e(t)$ segments by time t. Consequently, links preserve FIFO discipline for forwarding packets. The model presumes that all packets being sent along a particular link are pipelined. For each link e, $H_e(\cdot; t)$ is the (discrete) probability distribution function of $R_e(t)$ for all $t \geq 0$; i.e., $H_e(x; t)=P\{R_e(t) \leq x\}$. For simplicity purposes only, in the traffic model, $R_e(t)$, $e \epsilon E$, $t \geq 1$, are mutually independent.

The rate distribution $H_e$ on a virtual link e depends on the load introduced by the total traffic (i.e., internal plus external traffic) visiting the virtual link. Since it is difficult to explicitly model the impact of the external traffic dynamics on a virtual link, in the traffic model, the distribution of the amount of the external load is static; i.e., the distribution does not change over the $\Delta$ time units under observation, and thus, $H_e(\cdot; t) = H_e(\cdot)$ for all $t \leq \Delta$. As for the impact of the internal load on link e, as determined by the redundancy introduced by the present invention, penalty functions are introduced to the rate distribution $H_e$. As will be described below, penalty functions are used such that for each x, $H_e(x)$ decreases monotonically as "b·s" increases; i.e., the rates are stochastically smaller when the internal load (b·s) is high.

The impact of different levels of external load are modeled by presuming that packets are most likely to be dropped if the external load is high. Specifically, a Bernoulli random variable with probability $\gamma$ is used to model the event of packet loss on a particular segment of a link due to buffer overflow caused by excessive external traffic. A large value of $\gamma$ is used to model high external traffic loads. The network traffic model will treat a message dropped from one segment as independent from other segments and links and is also independent of the rates $R_e(t)$.

A description of a network information model now follows. At time 0, there is a file F generated at the origin o that needs to be sent to a destination d. The information must reach d by time $\Delta$. The information to be sent will be split into b pieces, of size s packets/messages each, such that any m pieces ($m \leq b$) are sufficient to reconstruct the file F.

The IDA disclosed by Rabin can be summarized as follows. The splitting of a file F is done in two steps. First, b vectors $a_i$, i=1, 2, ... b, each with m elements are chosen from $Z_p^m$ (i.e., the finite field constructed from residues mod p) such that every subset of m distinct vectors are linearly independent. Second, the file F is split into b subsets, $S_1$, $S_2$, ... $S_b$, each of length m. The "ith" piece of the file (also referred to herein as a packet-train) is given by $F_i = (c_{i,1}, c_{i,2}, \ldots, C_{i,N/m})$, where N is the number of characters in the file and $c_{i,k}$ is the dot product of $a_i$ and $S_k$.

Construction of the file at the destination d is based on creating an "m×m" matrix A whose ith row is the vector $a_i$. Rabin shows how $a_1, a_2, \ldots, a_b$ can be constructed in time $O(m^2)$. Since the matrix A needs to be computed only once, the time complexity of the IDA is $O(|F|)$ for $m^2 \leq |F|$. Since $bs \geq |F|$, splitting may result in redundancy. It is desirable to determine optimal values of b, s and m to maximize the probability that the file can be reconstructed by time $\Delta$.

The inventors of the present invention have created a unique network routing model. Given an origin-destination pair, a file F and a QoS parameter $\Delta$ as the bound on the end-to-end delay, the network routing of the present invention determines (1) route selection (i.e., path selection) and (2) flow assignment: optimal values of the train size and number of trains to be sent on each link to maximize the probability that $|F|/s$ trains will arrive to the destination within a total time of at most $\Delta$.

According to the routing model, fixed and small size (s) data packets are packed into pieces (i.e., trains). There can be multiple trains, up to b, moving from the source to destination. Each piece (train) moves through the network like a worm. Pieces are broken into units (referred to herein as packets/messages) subject to flow control. Packets/messages belonging to the, same piece are pipelined over the same virtual link between IDA-capable routers.

The model defines an instance of the redundant routing with deadlines solution as one to determine the optimal values of b and s of a file F over a virtual topology $G=(V, E, l_e)$ for deadline $\Delta$. For a specific dispersal of file F with parameters b and m, the probability that the destination can reconstruct the file within the deadline $\Delta$ is referred to as probability of success. Similarly, the maximum probability that can be obtained for a given instance is called the maximum probability of success.

The inventors of the present invention have also created a unique QoS model. The end-to-end QoS provided to the application is a probabilistic one. An application-specific QoS threshold is used to specify an "acceptable" uncertainty to the QoS guarantee provided to the application. If the maximum probability of success is above the specified threshold, then the QoS requirement of the application is satisfied, probabilistically. Of course, if the maximum probability of success is equal to 1, then the QoS guarantee is deterministic. However, if it is less than 1, then there is a chance that the file cannot be reconstructed at the destination within the deadline.

Thus, there are two application specific measures of the probabilistic QoS: (1) the deadline $\Delta$ (time bound) and (2) the probability of constructing the file within this bound. As the $\Delta$ becomes smaller, the probability of success decreases monotonically. The concept of a QoS threshold provides a tradeoff between the time bound and the maximum probability of success. Upper and lower bounds on these measure, specific to each application, can be set. For example, for a real-time application without a reliable-delivery requirement, the following may define a probabilistic QoS: If the probability that it takes at most ten milliseconds is at least 0.95, then it is acceptable. On the other hand, for those applications with reliable-delivery requirements, the probability of success should be closer to one and this may be achieved by having a larger $\Delta$ (e.g., if the probability that it takes at most one hour is above 0.9995, then it is acceptable).

To obtain an analytically traceable network model, a simple network topology, one in which there are only origination o and destination d nodes, is used. Packets of information are sent from o to d. There are $u \geq 1$ links (or directed edges) from o to d over which the packets are to be sent.

For discussion purposes only, a total of b pieces are to be sent from o to d. Let $b_e \geq 0$ be the number of pieces sent along link e, $e \in E$, where $b_1 + b_2 + \ldots + b_u = b$. Suppose that piece k is sent along some link e, and let T(k) be the time that piece k arrives (corrupted or uncorrupted) at the destination d. For piece k, let A(k)=1 if none of the packets in the piece were corrupted in the transmission along any of the segments in the link, and let A(k)=0 otherwise. It is desirable to determine values of s, $b_1, b_2, \ldots b_u$ and m to maximize the probability $\psi(s, b_1, b_2, \ldots b_u, m) \equiv P\{\exists k_1 < k_2 < \ldots k_m: T(k_j) \leq \Delta \text{ and } A(k_j)=1, j=1, 2, \ldots, m\}$, which is the probability that at least m pieces arrive uncorrupted at the destination d by time $\Delta$ so that the file F can be reconstructed. Once s and b are determined, we let m=F/s. The parameters s and b must satisfy the constraints $bs \geq F$, $b \geq 1$ and $s \leq F$.

The probability that piece k arrives to the destination d uncorrupted is referred to as $P\{A(k)=1\}$. Piece k will travel over link e. Considering a particular message within piece k, there are $l_e$ segments on link e, the probability that the message is not corrupted in the transmission is $(1-\gamma)^{l_e}$. Since there are s packets in the piece k, the probability that the piece is not corrupted is $q(e) \equiv (1-\gamma)^{l_e \cdot s}$. The loss probability $\gamma$ is an external parameter reflecting the randomness of the traffic load induced by other source-destination pairs.

The inventors have examined two separate constraints, illustrative of link and network performance, to come up with closed form solutions maximizing the probability $\psi(s, b_1, b_2, \ldots b_u, m)$ that a file can be delivered and reconstructed, under these different network constraints. By maximizing the probability $\psi(s, b_1, b_2, \ldots b_u, m)$, an expected QoS guarantee can be provided to an application (using the redundancy with a deadline technique of the present invention).

The first network constraint covers the situation where the number of pieces $b_e$ sent along link e is at most one, and all of the links e have the same number of segments $\lambda \geq 1$. This constraint, which is useful in situations where there are many disjoint paths between the origin and destination and the origin would like to send information under this constraint. The total number of pieces b sent is at most u. We assume that piece k is sent on link e=k. Moreover, since all of the links have $\lambda$ segments, the probability that any one piece arrives at destination d uncorrupted is $q=(1-\gamma)^{\lambda s}$. Also, the rates $R_e(t)$ will have a common distribution H for all links e and at all times t. Hereinafter, the phrase "single piece constraint" will be used to refer to this network constraint.

The time T(k) for piece k to arrive (corrupted or uncorrupted) at destination d is defined as follows. Since there are s packets in any piece, the time for piece k to arrive at d is the time that the last message in the piece arrives. Since piece k is the first (and only) one to be sent along link e and letting $\beta = l_e + s$:

$$T(k) = \min\left\{n : \sum_{i=1}^{n} R_c(i) \geq \beta\right\},$$

and for $t \geq 1$, $$P\{T(k) = t\} = \sum_{j=0}^{\beta-1} P\{R_c(t) \geq \beta - j\} P\{R_c(1) + \ldots + R_c(t-1) = j\},$$

because the rate $R_c(t)$, $t \geq 0$, are independent. We can then compute $G_k(\Delta) \equiv P\{T(k) \leq k\}$ as $$G_k(\Delta) = \sum_{t=1}^{\Delta} P\{T(k) = t\}.$$

To compute $\psi(s, b_1, b_2, \ldots b_u, m)$, we define a new variable T'(k), which equals T(k) if A(k)=1 and $\infty$ otherwise. Accordingly, $\psi(s, b_1, b_2, \ldots b_u, m) = P\{\exists k_1 < k_2 < \ldots k_m : T'(k_j) \leq \Delta, j=1, 2, \ldots, m\}$. We note that $$G'_k(\Delta) \equiv P\{T'(k) \leq \Delta\} = P\{T(k) \leq \Delta, A(k) = 1\} = G_k(\Delta) P\{A(k) = 1\}$$

by the independence of T(k) and A(k). Since all of the links have the same length, all of the T(k) have the same distribution $G_k = G$, which implies that all of the T'(k) have the same distribution $G'_k = G'$. Also, since the $R_e(t)$, $e \in E$, are independent, the T(k), k=1, 2, ..., b, are independent, and similarly the T'(k), k=1, 2, ..., b are independent. Thus, $$\psi(s, b_1, b_2, \ldots b_u, m) = \sum_{j=m}^{b} \binom{b}{j} (G(\Delta)(1-\gamma)^{\lambda s})^j (1 - G(\Delta)(1-\gamma)^{\lambda s})^{b-j}. \quad (1)$$

As noted above, the rate $R_e(t)$ is determined by the amount of total (internal plus external) traffic on link e at time t. Since the present invention does not have control over the external traffic, it is difficult to determine the total load on a virtual link. Thus, the rate $R_e(t)$ is modeled as a random variable. The inventors of the present invention have considered two specific types of distributions out of several for the rates. The first type is referred to as a geometric distribution and the second type is a uniform distribution. It must be noted that any type of rate distribution can be plugged into the calculation of $\psi(s, b_1, b_2, \ldots b_u, m)$ and that the invention is not to be limited to the two example distributions that follow. As will be described below, each network router has the capability of determining its links rate distribution via statistical analysis of the network performance. Thus, if a network router knows that its link rate distribution is other than a geometric or uniform distribution, then the determined distribution would be used.

The geometric distribution models the situation in which there is a heavy traffic load most of the time, but occasionally, the virtual links are lightly loaded. The model presumes for $i \geq 1$, $P\{R_e(t) = i\} = (1-\alpha)^{i-1}\alpha$; that is, $R_e(t)$ has a geometric distribution with parameter $\alpha$, $0 < \alpha < 1$. The independence of $R_e(t)$, $t \geq 1$, implies that for $j \geq t-1$, $$P\{R_c(1) + \ldots + R_c(t-1) = j\} = \alpha^{t-1}(1-\alpha)^{j-t+1}\binom{j-1}{j-t+1}),$$

and $$P\{R_c(1) + \ldots + R_c(t-1) = j\} = 0 \text{ if } j < t-1.$$

From this we can calculate $$P\{T(k) = t\} = \alpha^{t-1}(1-\alpha)^{\beta-t}\binom{\beta-1}{\beta-t}.$$

Hence, for $$\Delta < \beta, \; G(\Delta) = \sum_{t=1}^{\Delta} \alpha^{t-1}(1-\alpha)^{\beta-t}\binom{\beta-1}{\beta-t} = (1-\alpha)^{\beta-1}\sum_{t=1}^{\Delta}\left(\frac{\alpha}{1-\alpha}\right)^{t-1}\binom{\beta-1}{\beta-t},$$

and $$G(\Delta) = 1 \text{ for } \Delta \geq \beta.$$

This $G(\Delta)$ based on the geometric distribution for $R_e(t)$ is substituted into the calculation of $\psi(s, b_1, b_2, \ldots b_u, m)$.

The uniform distribution models the situation in which the amount of external traffic is highly variable over time. The model presumes that for i=1, 2, ..., $\eta$, $P\{R_e(t) = i\} = 1/\eta$. That is, $R_e(t)$ has a discrete-uniform distribution on $\{1, 2, \ldots, \eta\}$. With this presumption, it is possible to derive the $$P\{T(k) = t\} =$$

$$1/\eta^t \sum_{j=t-1}^{(\beta-1)\wedge(t-1)\eta} (\eta - \beta + j + 1)\delta(\eta - \beta + j + 1) \sum_{\nu=0}^{(j-t+1)/\eta} (-1)^{\nu}\binom{t-1}{\nu}\binom{j-\nu\eta-1}{t-2},$$

where $\delta(x) = 1$ if $x > 0$ and $\delta(x) = 0$ if $x < 0$. This expression for $P\{T(k) = t\}$ based on the uniform distribution of $R_e(t)$ can now be used to compute $G(\Delta)$ and $\psi(s, b_1, b_2, \ldots, b_u, m)$.

The second network constraint covers the situation where the number of pieces b is greater than u. Hence more than one piece may be sent along some links; that is, there may be $b_e \geq 1$ for some links e. With this constraint, the links e may have different lengths $l_e$. Hereinafter, the phrase "arbitrary piece constraint" will be used to refer to this network constraint. In this arbitrary piece constraint, $M_e$ represents the (random) number of pieces that arrive uncorrupted by time $\Delta$ along link e. $N_e$ represents the (random) number of pieces that arrive (corrupted or uncorrupted) by time $\Delta$ along link e. M is the number of pieces over all the links that arrive uncorrupted to the destination by time $\Delta$. Then, $$\psi(s, b_1, b_2, \ldots b_u, m) = \qquad (2)$$

$$\sum_{\substack{c=m \\ m_1+\ldots+m_u mc}}^{b} \sum_{0 \leq m_c \leq b_c, c \in E} \prod_{e \in E} \sum_{n_c=m_c}^{b_c} \binom{n_c}{m_c} q(e)^{m_c} (1-q(e))^{n_c-m_c} P\{N_c = n_c\},$$

where $P\{N_e=n_e\}=P\{l_e+n_e s \leq D_e(\Delta) < l_e+(n_e+1)s\}$ if $n_e<b_e$ and $P\{N_e=n_e\}=P\{l_e+n_e s \leq D_e(\Delta)\}$ if $n_e=b_e$; and where $D_e(\Delta)=R_e(1)+R_e(2)+\ldots R_e(\Delta)$.

The distribution of $D_e(\Delta)$ can also be one of several types of distributions. Again, for illustrative purposes only, a geometric and uniform distribution, will be computed for the arbitrary piece constraint. As stated above, it must be noted that any type of rate distribution can be plugged into the calculation of $\psi(s, b_1, b_2, \ldots b_u, m)$ and that the invention is not to be limited to the two example distributions that follow.

The geometric distribution model presumes for $i \geq 1$, $P\{R_e(t)=i\}=(1-\alpha)^{i-1}\alpha$; that is, $R_e(t)$ has a geometric distribution with parameter $\alpha$, $0<\alpha<1$.
Thus, $$P\{D_c(\Delta) = j\} = \alpha^\Delta (1-\alpha)^{j-\Delta} \binom{j-1}{j-\Delta}$$

if $j \geq \Delta$ and $$P\{D_c(\Delta) = j\} = 0 \text{ if } j < \Delta.$$

Letting $x \vee y = \max(x, y)$ and if $n_e<b_e$, then $$P\{N_c = n_c\} =$$

$$\sum_{j=(t_c+n_c s)\vee\Delta}^{t_c+(n_c+1)s-1} \alpha^\Delta (1-\alpha)^{j-\Delta} \binom{j-1}{j-\Delta} = \left(\frac{\alpha}{1-\alpha}\right)^\Delta \sum_{j=(t_c+n_c s)\vee\Delta}^{t_c+(n_c+1)s-1} (1-\alpha)^j \binom{j-1}{j-\Delta}.$$

Also, if $n_e=b_e$, then $$P\{N_c = n_c\} = 1 - P\{D_c(\Delta) < l_c+n_c s\} = 1 - \left(\frac{\alpha}{1-\alpha}\right)^\Delta \sum_{j=\Delta}^{l_c+n_c s-1} (1-\alpha)^j \binom{j-1}{j-\Delta}.$$

These expressions for $P\{N_e=n_e\}$ based on the geometric distribution of $R_e(t)$ can now be used to compute $\psi(s, b_1, b_2, \ldots b_u, m)$ for the arbitrary piece constraint.

The uniform distribution model presumes that for $i=1, 2, \ldots, \eta$, $P\{R_e(t)=i\}=1/\eta$. That is, $R_e(t)$ has a discrete-uniform distribution on $\{1, 2, \ldots, \eta\}$. With this presumption, it is possible to define $P\{D_e(\Delta)=j\}$ as follows:

$$P\{D_c(\Delta) = j\} = \begin{cases} \frac{1}{\eta^\Delta} \sum_{v=0}^{\lfloor\frac{j-\Delta}{\eta}\rfloor} (-1)^v \binom{\Delta}{v}\binom{j-v\eta-1}{\Delta-1} & \text{if } \Delta \leq j \leq \Delta\eta \\ 0 & \text{otherwise.} \end{cases}$$

Hence, if $n_e<b_e$, then $$P\{N_c = n_c\} = \frac{1}{\eta^\Delta} \sum_{j=(t_c+n_c s)\vee\Delta}^{(t_c+(n_c+1)s-1)\wedge\Delta\eta} \sum_{v=0}^{\lfloor\frac{j-\Delta}{\eta}\rfloor} (-1)^v \binom{\Delta}{v}\binom{j-v\eta-1}{\Delta-1});$$

Also, if $n_e=b_e$, then $$P\{N_c = n_c\} = 1 - \frac{1}{\eta^\Delta} \sum_{j=\Delta}^{(t_c+n_c s-1)\wedge\Delta\eta} \sum_{v=0}^{\lfloor\frac{j-\Delta}{\eta}\rfloor} (-1)^v \binom{\Delta}{v}\binom{j-v\eta-1}{\Delta-1}).$$

These expressions for $P\{N_e=n_e\}$ based on the uniform distribution of $R_e(t)$ can now be used to compute $\psi(s, b_1, b_2, \ldots b_u, m)$ for the arbitrary piece constraint.

Up to this point, it has been presumed that for each link e, the rates $R_e(t)$, where $t=1, 2, 3, \ldots$, are mutually independent. A generalization can be made such that $R_e \equiv \{R_e(t): t=1, 2, 3, \ldots\}$ is a time-homogeneous discrete-time Markov chain on a state space S, which is a subset of the positive integers, with transition probability matrix $P_e=(P_e(i,j): i,j \in S)$ and initial distribution $\pi=(\pi(i): i \in S)$. This generalization allows for some dependency between the rates over time. Thus, it is possible to have:

$$P\{D_c(\Delta) = j\} = \sum_{\substack{i_1, i_2, \ldots i_\Delta: \\ i_1+i_2+\ldots+i_\Delta=j}} \pi(i_1) \prod_{k=1}^{\Delta-1} P(i_k, i_{k+1}).$$

As stated earlier, the use of redundancy will impact the internal traffic of the network. Thus, penalty functions are incorporated into rate distributions to reflect this impact. The purpose of including penalty functions is to prevent the present invention from driving the links into congestion. It is possible to keep the load on each link below some threshold by choosing the penalty functions carefully. For example, in S. J. Golestani and S. Bhattacharyya, in A Class of End-to-End Congestion Control Algorithms for the Internet, Proc. of ICNP '98, October, incremental link cost functions were used to guarantee that the loss probability was below a given bound. The inventors of the present invention propose three different penalty functions, any of which can be incorporated into the rate distribution of the present invention.

Initially, for each link e, the probability distribution He governing the rates on the link stochastically decreases when there is an increase in the number of packets sent over the network (b·s, where b is the number of pieces sent and s is the number of packets in each piece). Specifically, the distribution is parameterized as $He^{(bs)}$, and we presume that $He^{(bs)}(x)$ increases monotonically as bs increases for each x. For simplicity purposes, we let $He^{(bs)}=H^{(bs)}$ for all links e. That is, the rates on all links have the same distribution.

The first penalty function is a linear function of bs and is the most conservative since it places a heavy penalty on redundancy. This linear penalty function sets $\alpha=bs/uF$. The second penalty function is quadratic in bs and imposes less of a penalty in comparison to the linear penalty function. The quadratic penalty function sets $\alpha=(bs/uF)^2$. Finally, the third penalty function is exponential in bs and sets $$\alpha = \alpha_0 + \alpha_1 \left( \frac{e^{bs/uF} - e^{(1/u)}}{e^1 - e^{(1/u)}} \right),$$

where $0<a_0<1$ is small, $0<a_1<1$ is close to 1, and $a_0+a_1<1$. This exponential penalty function penalizes less than the linear and quadratic functions in the range of bs (o<bs<uF).

In addition to penalizing the average rate at which packets traverse the network when a source sends high redundancy, it is also possible to mark its packets and drop them with a higher probability inside the network; compared to those packets from sources that use low redundancy. This may be accomplished by connecting the loss probability $\gamma$ with the penalty function by letting $\gamma = g(\alpha)$, where g is a non-decreasing function that takes on values in (0,1). For example, $\gamma = \alpha^k$ for some $k \geq 1$ (the larger values of k will result in smaller $\gamma$ values in this example since $0<\alpha<1$).

Figure 3A:
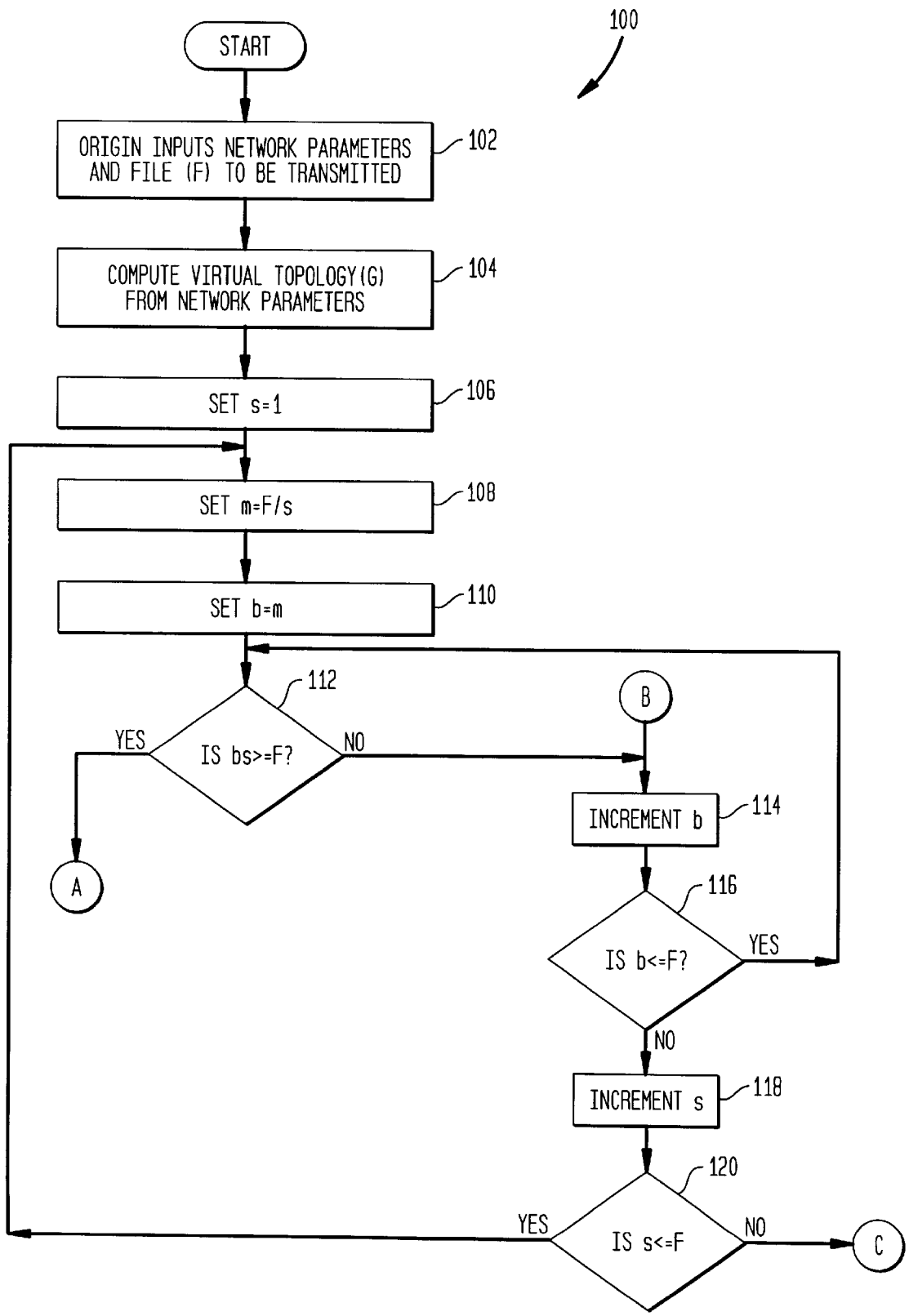
FIGS. 3a–3c illustrate in flowchart form an exemplary method of providing an expected quality of service (QoS) guarantee using redundancy with a deadline.
Figure 3B:
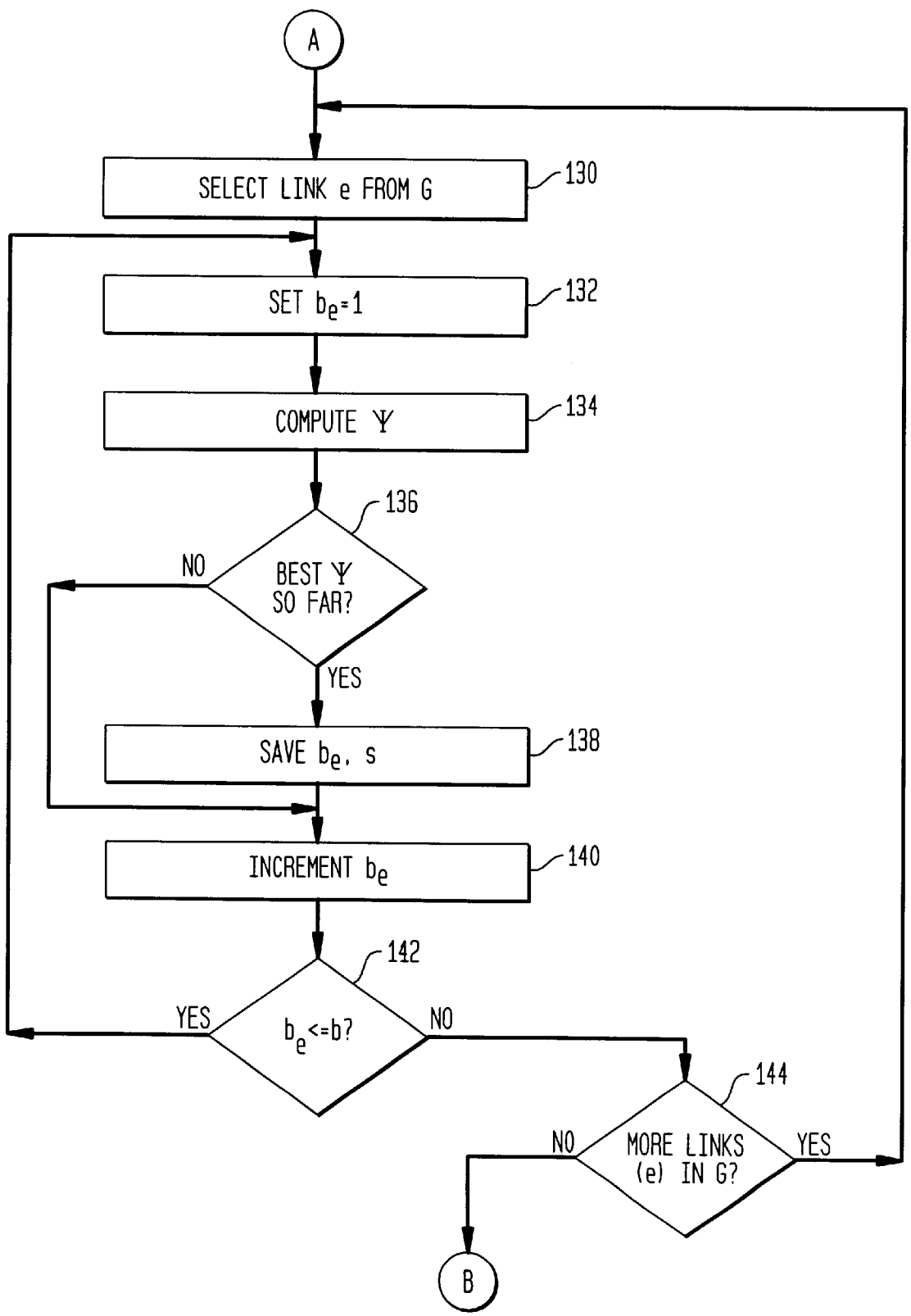
Figure 3C:
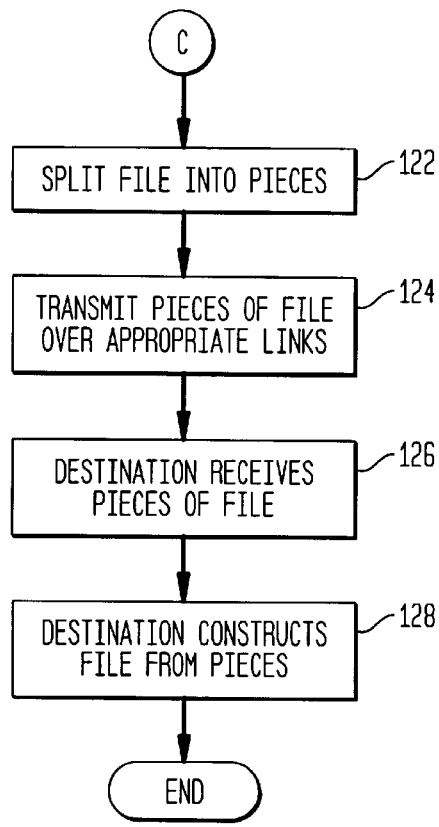

Referring now to FIGS. 3a–3c, an exemplary method 100 of the present invention is now described. The method 100 will break up a file F to be transmitted from a sender router (referred to herein as the origin) to a receiver router (referred to herein as a destination) into b pieces, each of size s, and uses redundancy such that any $m \equiv |F|/s$ pieces are enough to reconstruct the file within a time deadline $\Delta$. As stated earlier with reference to the network routing algorithm, two items must be determined. They are route selection and flow assignment processes.

Given a physical network topology, the maximum number of edge-disjoint paths from the origin o to the destination d can be computed. This can be performed using conventional max-flow-min-cut algorithms due to Menger. The edge union of the disjoint paths induces a virtual topology $G=(V, E, 1_e)$ where V is the set of IDA-capable nodes and E is the set of virtual links. The virtual topology G is used by the flow assignment process. A virtual link is simply a tunnel between IDA-capable routers, disjointness does not need to be at the physical level, instead it can be at the virtual level.

Thus, the method 100 begins at step 102 when the origin inputs the file to be transmitted and network parameters needed to compute a virtual topology G and the probability $\psi$ (s, $b_1$, $b_2$, . . . $b_u$, m). These parameters will include the number of links, the length of each link and the loss probability of each link. In addition, the time deadline $\Delta$ will be input along with the file. In step 104, the virtual topology G is computed by the origin based on the input parameters. It should be noted that the file F and deadline $\Delta$ do not have to be input along with the inputting of the network parameters. In fact, the method 100 could be modified such that the inputting of the network parameters and computation of the virtual topology G can be performed periodically and regardless of whether a file has also been input.

Once the virtual topology is determined, the flow assignment process must determine values for $b_1$, $b_2$, . . . $b_u$ and s that maximize the probability $\psi$ (s, $b_1$, $b_2$, . . . $b_u$, m) subject to the constraints that $bs \geq F$, $b \geq 1$ and $s \leq F$, where as described above, $b=b_1+b_2+$ . . . $b_u$ and one of the three penalty functions are incorporated into the computation. To do so, the method 100 continues at step 106 where the size s is set to 1. At step 108, m is set to F/s in accordance with the IDA described above. At step 110, the parameter b is set to m. As will be described below, the parameters s, m and b will be used to compute a maximized probability $\psi$ (s, $b_1$, $b_2$, . . . $b_u$, m).

At step 112, it is determined if $bs \geq F$. This is one of the constraints imposed on the computation of the probability $\psi$ (s, $b_1$, $b_2$, . . . $b_u$, m). If it is determined that $bs \geq F$, the method 100 continues at step 130 where a link e is selected from the virtual topology G. At step 132, the number of pieces for the selected link $b_e$ is set to 1. At step 134 $\psi$ (s, $b_1$, $b_2$, . . . $b_u$, m) is computed.

Also at step 134, prior to the computation, the origin has determined which network constraint is proper and which rate distribution is proper for the computation based upon the network parameters input at step 102 and overall network performance. That is, the origin has selected either the single piece constraint or the arbitrary piece constraint and thus, the appropriate equation for $\psi$ (s, $b_1$, $b_2$, . . . $b_u$, m). In addition, the origin has selected a rate distribution based upon the network parameters input at step 102 and overall network performance. As stated above, this could include the geometric, uniform or any other distribution suitable for the current rate distribution. Finally, in order to properly compute $\psi$ (s, $b_1$, $b_2$, . . . $b_u$, m) the origin must also select one of the three penalty functions. That is, the origin must decide whether to incorporate a linear, quadratic or exponential penalty function to compensate for the effects of the redundancy introduced by the method 100. Although the selection of the constraint, rate distribution and penalty function have all been described as occurring at step 134, it should be noted that these selection can occur at any time and with any other step of the method 100, as long as they are completed prior to the computation of $\psi$ (s, $b_1$, $b_2$, . . . $b_u$, m).

Once the computation of $\psi$ (s, $b_1$, $b_2$, . . . $b_u$, m) is complete, the method 100 continues at step 136 to determine if the result of this computation is the best (i.e., largest) so far. It is desirable to maximize $\psi$ (s, $b_1$, $b_2$, . . . $b_u$, m) in order to provide a maximized expected QoS guarantee. This step can be performed by comparing prior computations of $\psi$ (s, $b_1$, $b_2$, . . . $b_u$, m) to the current computation. If at step 136 it was determined that the current computation of $\psi$ (s, $b_1$, $b_2$, . . . $b_u$, m) is not the best so far, the method 100 continues at step 140. If the current computation is the best so far, then the values of be and s are stored as the "optimal" $b_e$ and s since they provide the best $\psi$ (s, $b_1$, $b_2$, . . . $b_u$, m) (step 138). At this point the method 100 continues at step 140.

The parameter $b_e$ is incremented (step 140) and it is determined if $b_e \geq b$ (step 142). If it is determined that $b_e \geq b$, the method continues at step 134 where the next $\psi$ (s, $b_1$, $b_2$, . . . $b_u$, m) computation occurs using the new value of $b_e$. If at step 142 it is determined that $b_e$ is not $\geq b$ (i.e., $b_e > b$), then the method 100 continues at step 144 where it is determined if there are more virtual links e in the virtual topology G. If there are more links, the method continues at step 130, where the next virtual link is selected and $\psi$ (s, $b_1$, $b_2$, . . . $b_u$, m) computations are made for the new link (steps 132 to 142). If there are no more links to consider, the method continues at step 114 where b is incremented. It should be noted that if at step 112 it is determined that bs not $\geq F$ (i.e., bs<F), then the method 100 will also continue at step 114.

At step 116 it is determined if $b \leq F$. This is another constraint imposed on the computation of $\psi$ (s, $b_1$, $b_2$, . . . $b_u$, m), since the number of pieces b cannot be greater than the size of the file F. If it is determined that $b \leq F$, the method 100 continues at step 112 to determine if $bs \geq F$ (as described above). If it is determined that b is not $\leq F$ (i.e., >F), then the method 100 continues at step 118 where s is incremented. At step 120 it is determined if $s \leq F$. This is another one of the constraints imposed on the computation of $\psi$ (s, $b_1$, $b_2$, . . . $b_u$, m). If it is determined that $s \leq F$, then the method 100 continues at step 108 where m is set to F/s so that another loop of computations, with a new s and m may be performed so that a maximized $\psi$ (s, $b_1$, $b_2$, . . . $b_u$, m) can be obtained for every virtual link in the topology G.

If at step 120 it is determined that s is not ≦F (i.e., s>F), then the method 100 continues at step 122. At this point optimal values of b and s have been obtained for every virtual link between the origin and destination. Thus, the file can be split into the appropriate number and sized pieces using the IDA (step 122). The pieces of the file will contain enough redundancy such that only m=|F|/s pieces are required to reconstruct the file. At step 124, the pieces are transmitted to the destination over the necessary number of virtual links. The pieces will be encoded with a header portion identifying the pieces as IDA pieces in a manner similar to the way multi-cast packets are identified. The destination must be an IDA-capable router. That is, the destination must be able to recognize the IDA header portion and reconstruct the file according to the Rabin reconstruction technique. The necessary number of links may include all virtual links or merely a subset of the links if an expected QoS guarantee can be provided using a subset of virtual links. At step 126, the destination receives the pieces and at step 128 reconstructs the file from the received pieces. Note that only m=F/s pieces are required to reconstruct the file due to the redundancy.

Figure 4:
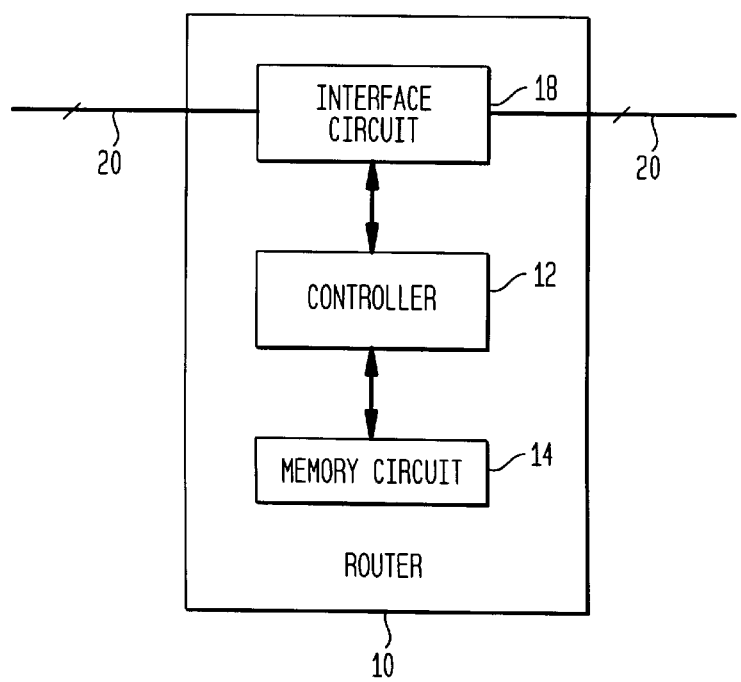
FIG. 4 illustrates a router constructed in accordance with the present invention.

The present invention is preferably implemented in software and is to be executed within router of a high-speed packet-switching data network such as the Internet. FIG. 4 illustrates an exemplary router 10. The router 10 includes a controller 12, memory circuit 14 and network interface circuit 18 connected in the conventional manner. The controller 12 may include a programmed microprocessor or an application specific integrated circuit (ASIC). The network interface circuit 18 may be a single circuit or multiple circuits capable of inputting and outputting data packets from/to communication links 20. As known in the art, the controller 12 is coupled to the memory 14 and is in communication with other network elements (not shown) via the network interface circuit 18 and communication links 20. As is also known in the art, the controller 12 controls and coordinates the operations of the router including, but not limited to, the inputting, routing and outputting of data packets over the links 20 (via the interface circuit 18). With the provision of some additional software, the controller 12 will also implement the origin (steps 102 to 124 and steps 130 to 144) and destination (steps 126 and 128) portions of the method 100 of the present invention (i.e., providing an expected QoS guarantee by using a redundancy with a deadline).

Figure 5:
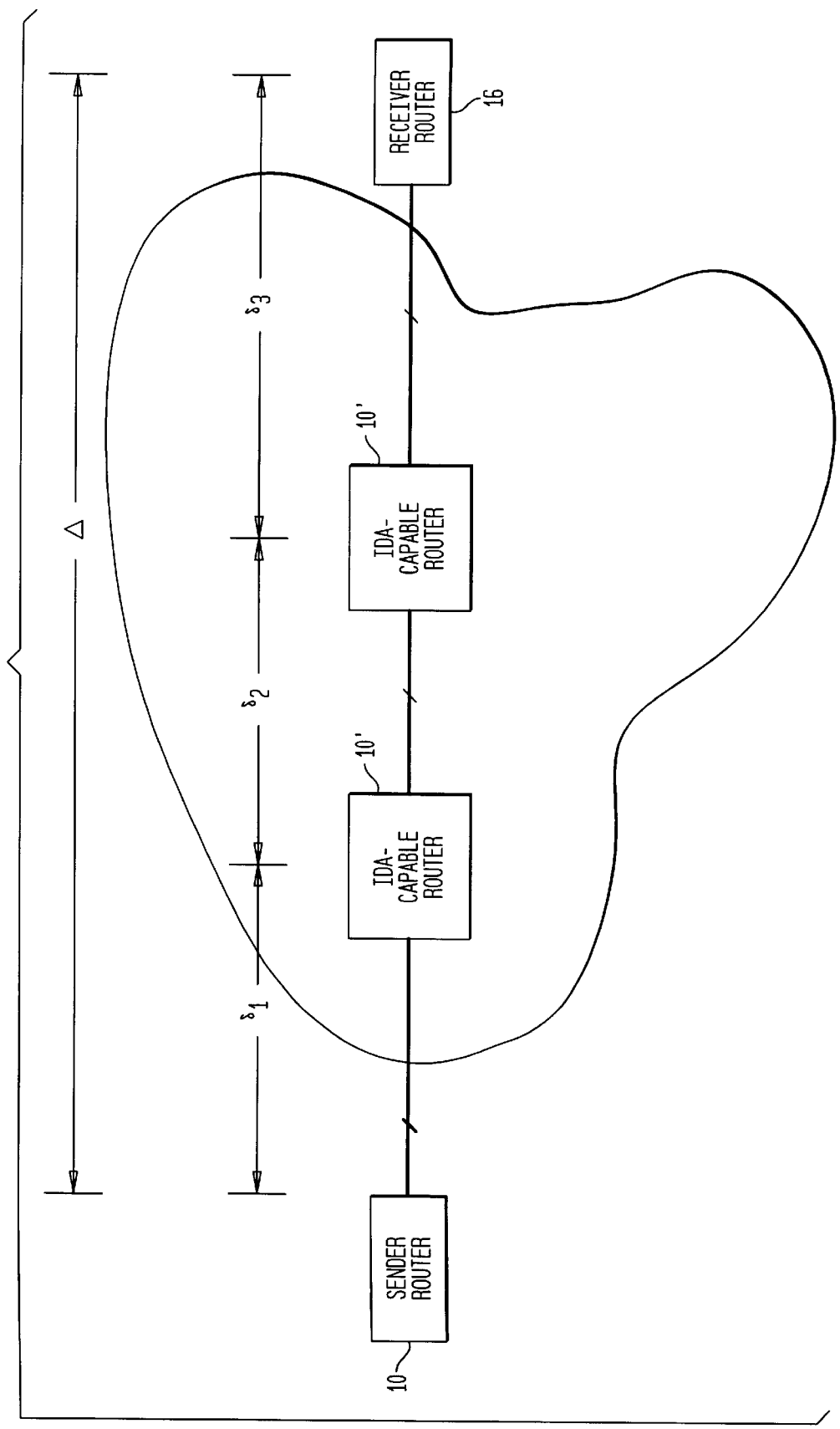
FIG. 5 illustrates another communication path between sender and receiver routers in a high-speed packet-switching network.

It should be noted that the present invention can be divided among several IDA-capable routers. Referring to FIG. 5, it can be seen that two IDA-capable routers 10' are provided between the sender and receiver routers 10, 16. Thus, it is possible to divide the time deadline Δ into individual deadline $\delta_1$(between the sender and first intermediate IDA-capable routers 10, 10'), $\delta_2$ (between the first and second intermediate IDA-capable routers 10', 10') and $\delta_3$ (between the second intermediate IDA-capable router 10' and the receiver router 16). For each router that will send the file towards the receiver router 16, that is the sender and two intermediate IDA-capable routers 10, 10', 10', individual ψ (s, $b_1$, $b_2$, ... $b_u$, m) computations and file splitting are performed. Instead of using the deadline Δ, each router uses its individual deadline $\delta_1$, $\delta_2$, or $\delta_3$.

Figure 6:
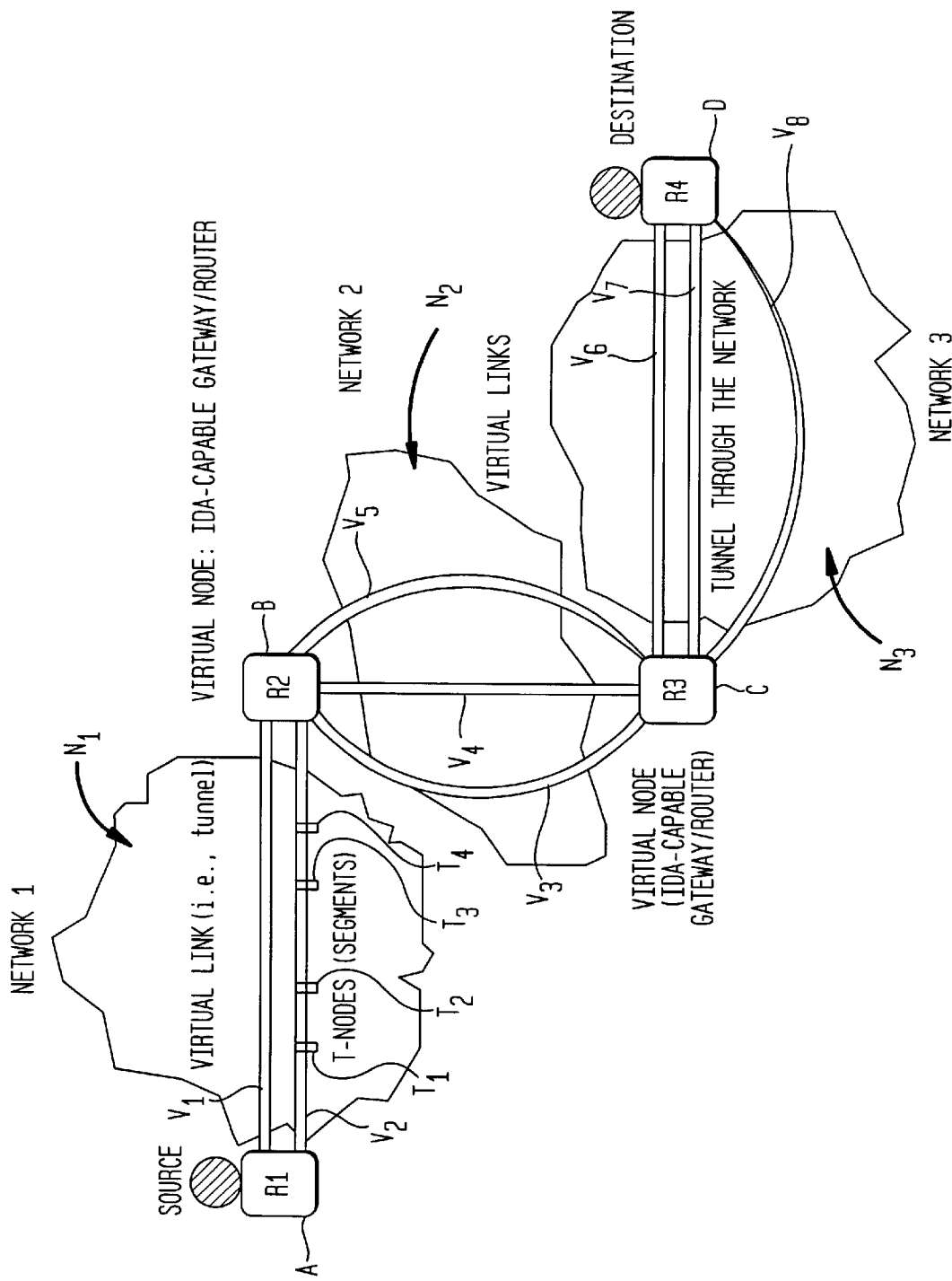
FIG. 6 illustrates an inter-network communication path between source and destination routers.

Likewise, the present invention can be divided among several networks. Referring to FIG. 6, it can be seen that as the distance between the source-destination pair (i.e., router A and router D) increases, it is likely that several domains/networks $N_1$, $N_2$, $N_3$ will be traversed. This is referred to as inter-networking and the main idea is to tunnel through a domain and reconstruct the file at an IDA-capable gateway (e.g., reference numerals B and C) and then disperse the file optimally for the next domain/network. This process is repeated for each domain/network traversed.

The union of the virtual links obtained in this approach induce a virtual network. This virtual network is a chain-like multigraph where there are several virtual links between adjacent virtual nodes (i.e., IDA-capable gateway routers). The virtual network is represented as a weighted directed graph G=(V, E, $1_w$), where V is the set of virtual links. Four virtual nodes A, B, C, D and eight virtual links $V_1$, $V_2$, ... $V_8$ are illustrated in FIG. 6. However, it should be noted that there can be any number of nodes, e.g., K nodes, and any number of virtual links between the source node R, and the destination node k. Thus graph G has links between nodes $R_i$ and $R_{i+1}$, where i=1, 2, ..., K-1.

At time 0, there is a file F generated at the source node $R_1$ that needs to be sent to the destination node $R_K$, which is presumed to reside in a different domain. The information must reach the destination node $R_K$ by time Δ. One example to maximize the probability that the file F can be reconstructed at the destination $R_K$ within the end-to-end delay bound Δ now follows.

Each virtual node behaves both as a virtual source (to the next hop) and virtual destination (from the previous hop). Thus, at each hop in the virtual network, the file F is first reconstructed and then dispersed to the next virtual node. One approach to try to achieve the end-to-end delay bound Δ is to allocate a node-to-node delay bound $\Delta_i$ to each pair of consecutive virtual nodes $(R_i, R_{i+1})$ such that $\Delta_1+\Delta_2+\ldots+\Delta_{K-1}\leq\Delta$. It should be noted that the space $\Omega=\{(\Delta_1, \Delta_2, \ldots \Delta_{K-1}): \Delta_1+\Delta_2 + \ldots +\Delta_{K-1}\leq\Delta\}$ can be very large. Thus, instead of searching over the entire space Ω to find the allocation of Δ that results in the largest probability of success, the following heuristic is applied. It is assumed that each virtual node $R_I$ can estimate the delay $\delta_i$ to send a single packet to node $R_{i+1}$ on the physical network. This is done in a manner similar to the RTT computation in TCP. Then, $\Delta_i$ is assigned in proportion to the $\delta_i$ as follows:

$$\Delta_i = \frac{\delta_i}{\sum_{j=1}^{K-1} \delta_i}\Delta.$$

Then for each pair of consecutive virtual nodes $(R_i, R_{i+1})$, ψ (s, $b_1$, $b_2$, ... $b_u$, m) computations and file splitting is performed for the time bound $\Delta_i$.

Thus, the present invention provides an application of a high-speed packet-switching network, such as the Internet, with an expected QoS guarantee using a redundancy with a deadline approach rather than reservations. Using redundancy with a deadline rather than reservations overcomes the shortcomings associated with the reservation-based techniques, such as additional complexity at the network nodes and strict queuing schemes, while providing an efficient expected QoS guarantee.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters patent of the United States is:

1. A computer implemented method of transmitting a file within a time deadline from an origin to a destination connected to a computer network, comprising the steps of:
   inputting at the origin network information, the network information comprising an identity of physical links between the origin and destination and performance parameters associated with each link;
   computing a virtual network topology based on the physical link information, the virtual topology including a plurality of virtual links between the origin and destination;
   splitting the file into a plurality of fixed-size pieces to be transmitted to the destination over respective virtual links and reconstructed within the time deadline, each of the fixed-size pieces containing redundant information so that only a subset of the plurality of pieces is required to reconstruct the file; and
   transmitting the plurality of pieces to the destination over their respective virtual links.

2. The method of claim 1 wherein said splitting step comprises:
   determining an optimal number of pieces and an optimal piece size such that a probability that the determined optimal number of pieces of the optimal piece size will be reconstructed at the destination within the time deadline; and
   splitting the file into the optimal number of pieces, each piece being of the determined optimal size.

3. The method of claim 2 wherein said step of splitting the file into the optimal number of pieces is performed using an information dispersal algorithm.

4. The method of claim 2 wherein said determining step is performed using a single piece constraint.

5. The method of claim 4 wherein said determining step uses a rate distribution of the virtual links to determine an expected traffic along the virtual links.

6. The method of claim 5 wherein said rate distribution is a geometric rate distribution.

7. The method of claim 5 wherein said rate distribution is an uniform rate distribution.

8. The method of claim 5 wherein said rate distribution includes a rate penalty function to determine an impact of performance of the virtual links due to transmitting the pieces over the virtual links.

9. The method of claim 8 wherein the penalty function is a linear function of a number of the fixed-size pieces, a size of the pieces and a size of the file.

10. The method of claim 8 wherein the penalty function is a quadratic function of a number of the fixed-size pieces, a size of the pieces and a size of the file.

11. The method of claim 8 wherein the penalty function is an exponential function of a number of the fixed-size pieces, a size of the pieces and a size of the file.

12. The method of claim 2 wherein said determining step is performed using an arbitrary piece constraint.

13. The method of claim 12 wherein said determining step uses a rate distribution of the virtual links to determine an expected traffic along the virtual links.

14. The method of claim 13 wherein said rate distribution is a geometric rate distribution.

15. The method of claim 13 wherein said rate distribution is an uniform rate distribution.

16. The method of claim 13 wherein said rate distribution includes a rate penalty function to determine an impact of performance of the virtual links due to transmitting the pieces over the virtual links.

17. The method of claim 16 wherein the penalty function is a linear function of a number of the fixed-size pieces, a size of the pieces and a size of the file.

18. The method of claim 16 wherein the penalty function is a quadratic function of a number of the fixed-size pieces, a size of the pieces and a size of the file.

19. The method of claim 16 wherein the penalty function is an exponential function of a number of the fixed-size pieces, a size of the pieces and a size of the file.

20. A computer implemented method of providing an expected quality of service guarantee to an application of computer network, comprising the steps of:
   inputting a file and a time deadline to an origin of the network from the application;
   inputting at the origin network information, the network information comprising an identity of physical links between the origin and a destination of the network and performance parameters associated with each link;
   computing a virtual network topology based on the physical link information, the virtual topology including a plurality of virtual links between the origin and destination;
   splitting the file into a plurality of fixed-size pieces to be transmitted to the destination over respective virtual links and reconstructed within the time deadline, each of the fixed-size pieces containing redundant information so that only a subset of the plurality of pieces is required to reconstruct the file;
   transmitting the plurality of pieces to the destination over their respective virtual links;
   receiving the pieces at the destination; and
   reconstructing the file from a subset of the received pieces.

21. The method of claim 20 wherein said splitting step comprises:
   determining an optimal number of pieces and an optimal piece size such that a probability that the determined optimal number of pieces of the optimal piece size will be reconstructed at the destination within the time deadline; and
   splitting the file into the optimal number of pieces, each piece being of the determined optimal size.

22. The method of claim 21 wherein said step of splitting the file into the optimal number of pieces is performed using an information dispersal algorithm.

23. The method of claim 21 wherein said determining step is performed using a single piece constraint.

24. The method of claim 23 wherein said determining step uses a rate distribution of the virtual links to determine an expected traffic along the virtual links.

25. The method of claim 24 wherein said rate distribution is a geometric rate distribution.

26. The method of claim 24 wherein said rate distribution is an uniform rate distribution.

27. The method of claim 24 wherein said rate distribution includes a rate penalty function to determine an impact of performance of the virtual links due to transmitting the pieces over the virtual links.

28. The method of claim 27 wherein the penalty function is a linear function of a number of the fixed-size pieces, a size of the pieces and a size of the file.

29. The method of claim 27 wherein the penalty function is a quadratic function of a number of the fixed-size pieces, a size of the pieces and a size of the file.

30. The method of claim 27 wherein the penalty function is an exponential function of a number of the fixed-size pieces, a size of the pieces and a size of the file.

31. The method of claim 21 wherein said determining step is performed using an arbitrary piece constraint.

32. The method of claim 21 wherein said determining step uses a rate distribution of the virtual links to determine an expected traffic along the virtual links.

33. The method of claim 32 wherein said rate distribution is a geometric rate distribution.

34. The method of claim 32 wherein said rate distribution is an uniform rate distribution.

35. The method of claim 32 wherein said rate distribution includes a rate penalty function to determine an impact of performance of the virtual links due to transmitting the pieces over the virtual links.

36. The method of claim 35 wherein the penalty function is a linear function of a number of the fixed-size pieces, a size of the pieces and a size of the file.

37. The method of claim 35 wherein the penalty function is a quadratic function of a number of the fixed-size pieces, a size of the pieces and a size of the file.

38. The method of claim 35 wherein the penalty function is an exponential function of a number of the fixed-size pieces, a size of the pieces and a size of the file.

39. A computer network router, comprising:
a controller, said controller being coupled to a computer network, said controller transmitting a file within a time deadline to a destination router connected to the computer network by:
inputting network information, the network information comprising an identity of physical links between said router and the destination router and performance parameters associated with each link;
computing a virtual network topology based on the physical link information, the virtual topology including a plurality of virtual links between said router and the destination;
splitting the file into a plurality of fixed-size pieces to be transmitted to the destination over respective virtual links and reconstructed within the time deadline, each of the fixed-size pieces containing redundant information so that only a subset of the plurality of pieces is required to reconstruct the file; and
transmitting the plurality of pieces to the destination over their respective virtual links.

40. The router of claim 39 wherein said controller splits the file by:
determining an optimal number of pieces and an optimal piece size such that a probability that the determined optimal number of pieces of the optimal piece size will be reconstructed at the destination within the time deadline; and
splitting the file into the optimal number of pieces, each piece being of the determined optimal size.

41. The router of claim 39 wherein said controller splits the file into the optimal number of pieces by using an information dispersal algorithm.

42. The router of claim 39 wherein said controller determines the optimal number of pieces and the optimal piece size using a single piece constraint.

43. The router of claim 42 wherein said controller determines the optimal number of pieces and the optimal piece size using a rate distribution of the virtual links to determine an expected traffic along the virtual links.

44. The router of claim 43 wherein said rate distribution is a geometric rate distribution.

45. The router of claim 43 wherein said rate distribution is an uniform rate distribution.

46. The router of claim 43 wherein said rate distribution includes a rate penalty function to determine an impact of performance of the virtual links due to transmitting the pieces over the virtual links.

47. The router of claim 46 wherein the penalty function is a linear function of a number of the fixed-size pieces, a size of the pieces and a size of the file.

48. The router of claim 46 wherein the penalty function is a quadratic function of a number of the fixed-size pieces, a size of the pieces and a size of the file.

49. The router of claim 46 wherein the penalty function is an exponential function of a number of the fixed-size pieces, a size of the pieces and a size of the file.

50. The router of claim 40 wherein said controller splits the file into the optimal number of pieces by using an arbitrary piece constraint.

51. The router of claim 50 wherein said controller determines the optimal number of pieces and the optimal piece size using a rate distribution of the virtual links to determine an expected traffic along the virtual links.

52. The router of claim 51 wherein said rate distribution is a geometric rate distribution.

53. The router of claim 51 wherein said rate distribution is an uniform rate distribution.

54. The router of claim 51 wherein said rate distribution includes a rate penalty function to determine an impact of performance of the virtual links due to transmitting the pieces over the virtual links.

55. The router of claim 54 wherein the penalty function is a linear function of a number of the fixed-size pieces, a size of the pieces and a size of the file.

56. The router of claim 54 wherein the penalty function is a quadratic function of a number of the fixed-size pieces, a size of the pieces and a size of the file.

57. The router of 54 wherein the penalty function is an exponential function of a number of the fixed-size pieces, a size of the pieces and a size of the file.

58. The router of claim 39 wherein said controller is a programmed processor.

59. The router of claim 39 wherein said controller is an application specific integrated circuit.

60. A computer system comprising:
a network communication medium;
a first router coupled to said communication medium;
a second router coupled to said communication medium and in communication with said first router;
said first router having a first controller, said first controller transmitting a file within a time deadline to said second router by:
inputting network information, the network information comprising an identity of physical links between said first router and said second router and performance parameters associated with each link;
computing a virtual network topology based on the physical link information, the virtual topology including a plurality of virtual links between said first router and said second router;
splitting the file into a plurality of fixed-size pieces to be transmitted to said second router over respective virtual links and reconstructed within the time deadline, each of the fixed-size pieces containing redundant information so that only a subset of the plurality of pieces is required to reconstruct the file;
transmitting the plurality of pieces to the destination over their respective virtual links; and said second router having a second controller, said second controller receiving the transmitted pieces and reconstructing the file from a subset of the received pieces.

61. The system of claim 60 wherein said first controller splits the file by:
   determining an optimal number of pieces and an optimal piece size such that a probability that the determined optimal number of pieces of the optimal piece size will be reconstructed at the destination within the time deadline; and
   splitting the file into the optimal number of pieces, each piece being of the determined optimal size.

62. The system of claim 61 wherein said first controller splits the file into the optimal number of pieces by using an information dispersal algorithm.

63. The system of claim 61 wherein said first controller determines the optimal number of pieces and the optimal piece size using a single piece constraint.

64. The system of claim 61 wherein said first controller determines the optimal number of pieces and the optimal piece size using a rate distribution of the virtual links to determine an expected traffic along the virtual links.

65. The system of claim 64 wherein said rate distribution is a geometric rate distribution.

66. The system of claim 64 wherein said rate distribution is an uniform rate distribution.

67. The system of claim 64 wherein said rate distribution includes a rate penalty function to determine an impact of performance of the virtual links due to transmitting the pieces over the virtual links.

68. The system of claim 67 wherein the penalty function is a linear function of a number of the fixed-size pieces, a size of the pieces and a size of the file.

69. The system of claim 67 wherein the penalty function is a quadratic function of a number of the fixed-size pieces, a size of the pieces and a size of the file.

70. The system of claim 67 wherein the penalty function is an exponential function of a number of the fixed-size pieces, a size of the pieces and a size of the file.

71. The system of claim 61 wherein said first controller splits the file into the optimal number of pieces by using an arbitrary piece constraint.

72. The system of claim 71 wherein said first controller determines the optimal number of pieces and the optimal piece size using a rate distribution of the virtual links to determine an expected traffic along the virtual links.

73. The system of claim 72 wherein said rate distribution is a geometric rate distribution.

74. The system of claim 72 wherein said rate distribution is an uniform rate distribution.

75. The system of claim 72 wherein said rate distribution includes a rate penalty function to determine an impact of performance of the virtual links due to transmitting the pieces over the virtual links.

76. The system of claim 75 wherein the penalty function is a linear function of a number of the fixed-size pieces, a size of the pieces and a size of the file.

77. The system of claim 75 wherein the penalty function is a quadratic function of a number of the fixed-size pieces, a size of the pieces and a size of the file.

78. The system of 75 wherein the penalty function is an exponential function of a number of the fixed-size pieces, a size of the pieces and a size of the file.

79. The system of claim 61 wherein said first controller is a programmed processor.

80. The system of claim 61 wherein said first controller is an application specific integrated circuit.

81. The system of claim 61 wherein said second controller is a programmed processor.

82. The system of claim 61 wherein said second controller is an application specific integrated circuit.

83. The system of claim 61 wherein said communication medium is connected to a high-speed packet switching network.

84. The system of claim 61 wherein said communication medium is connected to the Internet.

* * * * *